United States Patent
Hosotani

(10) Patent No.: US 8,854,850 B2
(45) Date of Patent: Oct. 7, 2014

(54) AC POWER SUPPLY APPARATUS

(71) Applicant: Murata Manufacturing Co., Ltd., Nagaokakyo (JP)

(72) Inventor: Tatsuya Hosotani, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 94 days.

(21) Appl. No.: 13/737,064

(22) Filed: Jan. 9, 2013

(65) Prior Publication Data

US 2013/0182480 A1 Jul. 18, 2013

(30) Foreign Application Priority Data

Jan. 13, 2012 (JP) ................... 2012-004565

(51) Int. Cl.
| | |
|---|---|
| *H02M 7/523* | (2006.01) |
| *H02M 7/538* | (2007.01) |
| *H02M 7/537* | (2006.01) |
| *H02M 7/527* | (2006.01) |
| *H02M 7/48* | (2006.01) |

(52) U.S. Cl.
CPC .............. *H02M 7/537* (2013.01); *H02M 7/538* (2013.01); *Y02B 70/1441* (2013.01); *H02M 2007/4815* (2013.01)
USPC ........................................ 363/98; 363/21.02

(58) Field of Classification Search
USPC ......... 363/21.02, 21.03, 95, 97, 98, 131, 132; 327/111
See application file for complete search history.

(56) References Cited

U.S. PATENT DOCUMENTS

| | | | | |
|---|---|---|---|---|
| 4,106,084 | A | * | 8/1978 | Gibert .................. 363/21.02 |
| 2012/0262954 | A1 | * | 10/2012 | Duvnjak .................. 363/21.02 |

FOREIGN PATENT DOCUMENTS

| | | |
|---|---|---|
| JP | 6-61074 A | 3/1994 |
| JP | 6-197542 A | 7/1994 |
| JP | 2001-186761 A | 7/2001 |
| JP | 2010-97798 A | 4/2010 |

* cited by examiner

*Primary Examiner* — Gary L Laxton
(74) *Attorney, Agent, or Firm* — Keating & Bennett, LLP

(57) ABSTRACT

In an AC power supply apparatus, first and second switching circuits connected in series to an input terminal to which a DC input power supply is connected include first and second rectification elements, respectively. A capacitor, an inductor, and a capacitive load are equivalently connected in series to the second switching circuit. The capacitor is charged after the first switching circuit is turned on before the second rectification element is turned off and the charged capacitor is caused to discharge after the second switching circuit is turned on before the second rectification element is turned off. The above operations are periodically repeated. The voltage of the capacitive load is reversed with current flowing during the charge and the discharge of the capacitor to adjust the on and off periods of the first and second switching circuits in order to supply desired AC voltage to the capacitive load.

12 Claims, 12 Drawing Sheets

AC POWER SUPPLY APPARATUS

BACKGROUND OF THE INVENTION

1. Field of the Invention

The present invention relates to an alternating current (AC) power supply apparatus that supplies AC voltage to a load.

2. Description of the Related Art

For example, in electrophotographic image forming apparatuses, it is necessary to prepare power supply apparatuses that supply AC high voltage to developing devices or discharging devices in photoconductor units. Japanese Unexamined Patent Application Publication No. 2001-186761 and Japanese Unexamined Patent Application Publication No. 6-197542 each disclose a high-voltage power supply apparatus that generates the AC high voltage. The high-voltage power supply apparatus described in Japanese Unexamined Patent Application Publication No. 2001-186761 includes an amplifier circuit. In the high-voltage power supply apparatus, a direct current (DC) component is cut off from an output from the amplifier circuit to transmit only an AC component and the AC voltage stepped up by a transformer is subjected to half-wave rectification. The high-voltage power supply apparatus described in Japanese Unexamined Patent Application Publication No. 6-197542 includes an LC series resonant circuit and a switching circuit. The switching circuit is switched to accumulate the inductance of the LC series resonant circuit and the accumulated energy is regenerated to control output voltage.

AC power supply circuits are reduced in size in recent years and further improvement in efficiency is desired. However, power loss in transistors is large in the amplifier circuits including the transistors, as in the power supply apparatus described in Japanese Unexamined Patent Application Publication No. 2001-186761. In contrast, although the power loss in the power supply apparatus described in Japanese Unexamined Patent Application Publication No. 6-197542 can be made smaller than that in Japanese Unexamined Patent Application Publication No. 2001-186761, the power supply apparatus described in Japanese Unexamined Patent Application Publication No. 6-197542 includes two capacitors serving as power supplies for generating positive and negative voltages of the AC voltage and the provision of the two capacitors prevents the reduction in size of the circuit.

SUMMARY OF THE INVENTION

Accordingly, it is an object of the present invention to provide an AC power supply apparatus capable of efficiently generating AC voltage from DC voltage and capable of realizing reduction in size.

According to a preferred embodiment of the present invention, an AC power supply apparatus supplies AC voltage to a capacitive load. The AC power supply apparatus includes an input terminal to which a DC power supply is connected; a first switching circuit in which a first switch element is connected in parallel to a first rectification element; a second switching circuit which is connected in series to the first switching circuit and in which a second switch element is connected in parallel to the a second rectification element; a transformer configured to include a primary winding and a secondary winding; a resonant inductor and a resonant capacitor configured to be connected in series to the primary winding; and a control unit configured to repeat first control in which, after the first switch element is turned on during a first period, the first switch element is turned off during a second period and second control in which, after the second switch element is turned on during a third period, the second switch element is turned off during a fourth period. The resonant inductor, the resonant capacitor, and the capacitive load compose a resonant circuit that has inductive impedance in which current is varied behind a variation in voltage. The control unit turns on the first switch element during the first period and applies current to the first switch element to charge the resonant capacitor; the control unit turns off the first switch element during the second period and applies current to the first rectification element to charge the resonant capacitor; the charge period is finished when no current flows; and the current during the charge period flows through the primary winding, induced current flows through the secondary winding, and current flows through the capacitive load to apply voltage. The control unit turns on the second switch element during the third period and applies current to the second switch element to cause the resonant capacitor to discharge; the control unit turns off the second switch element during the fourth period and applies current to the second rectification element to cause the resonant capacitor to discharge; the discharge period is finished when no current flows; and the current during the discharge period flows through the primary winding, induced current flows through the secondary winding, and reverse current with respect to that during the charge period flows through the capacitive load to apply reverse voltage. The control unit controls the first period and the third period to control an absolute value of the AC voltage and controls the second period and the fourth period to control a frequency of the AC voltage.

The AC power supply apparatus may further include a DC voltage source configured to apply bias voltage to the capacitive load.

The AC power supply apparatus may further include a secondary-side switch configured to connect or block a path between the capacitive load and ground.

The AC power supply apparatus may further include a power supply capacitor configured to be connected to both ends of the input terminal.

In the AC power supply apparatus, an LC series circuit composed of the primary winding, the resonant inductor, and the resonant capacitor may be connected to both ends of the first switching circuit or the second switching circuit.

The AC power supply apparatus may further include a series circuit composed of two shunt resonant capacitors, which is connected in parallel to a series circuit composed of the first switching circuit and the second switching circuit. An LC series circuit composed of the primary winding, the resonant inductor, and the resonant capacitor may be connected to a node between the first switching circuit and the second switching circuit and a node between the two shunt resonant capacitors.

The AC power supply apparatus may further include a third switching circuit in which a third switch element is connected in parallel to a third rectification element and a fourth switching circuit in which a fourth switch element is connected in parallel to a fourth rectification element. A series circuit composed of the third switching circuit and the fourth switching circuit may be connected in parallel to a series circuit composed of the first switching circuit and the second switching circuit. An LC series circuit composed of the primary winding, the resonant inductor, and the resonant capacitor may be connected to a node between the first switching circuit and the second switching circuit and a node between the third switching circuit and the fourth switching circuit.

In the AC power supply apparatus, the resonant capacitor may include two resonant capacitors and the resonant capacitors may be provided at one end and the other end of the LC series circuit.

In the AC power supply apparatus, the resonant capacitor may include two resonant capacitors and, instead of the transformer, the two resonant capacitors may be connected in series to the capacitive load to provide electrical insulation with the resonant capacitors and current may be applied to the capacitive load to apply voltage.

In the AC power supply apparatus, the resonant inductor, the first switch element, the second rectification element, and the resonant capacitor may compose a step-down converter during the first period and the second period, and the resonant inductor, the second switch element, the first rectification element, and the resonant capacitor may compose a step-up converter during the third period and the fourth period.

In the AC power supply apparatus, one end of the first switching circuit may be connected to one end of the input terminal via the primary winding and the resonant inductor. The other end of the first switching circuit may be connected to the other end of the input terminal. The resonant capacitor may be connected in parallel to a series circuit composed of the first switching circuit and the second switching circuit. The resonant inductor, the first switch element, the second rectification element, and the resonant capacitor may compose a step-up converter during the first period and the second period. The resonant inductor, the second switch element, the first rectification element, and the resonant capacitor may compose a step-down converter during the third period and the fourth period.

In the AC power supply apparatus, one end of a series circuit composed of the first switching circuit and the second switching circuit may be connected to one end of the input terminal via the resonant capacitor and the other end of the series circuit is connected to the other end of the input terminal. The primary winding and the resonant inductor may be connected between a node between the first switching circuit and the second switching circuit and the one end of the input terminal. The resonant inductor, the first switch element, the second rectification element, and the resonant capacitor may compose a step-up and step-down converter during the first period and the second period. The resonant inductor, the second switch element, the first rectification element, and the resonant capacitor may compose a step-up and step-down converter during the third period and the fourth period.

With the AC power supply apparatus according to the present invention, it is possible to efficiently generate AC voltage from one DC input power supply and to reduce the size of the AC power supply apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
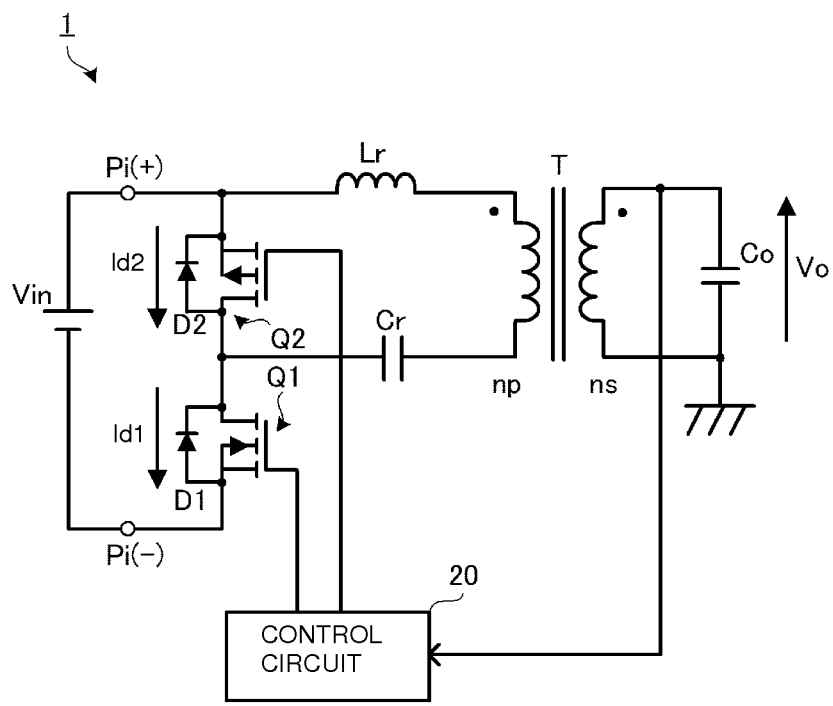
FIG. 1 is an exemplary circuit diagram of an AC power supply apparatus according to a first preferred embodiment.

FIG. 1 is an exemplary circuit diagram of an AC power supply apparatus according to a first preferred embodiment. An AC power supply apparatus 1 according to the first preferred embodiment includes a transformer T including a primary winding np and a secondary winding ns. The AC power supply apparatus 1 converts DC voltage that is received into AC voltage and outputs the AC voltage. The AC power supply apparatus 1 includes a pair of input terminals Pi(+) and Pi(−) through which the voltage of a DC input power supply Vin is input. The input terminal Pi(+) is at a high-voltage side and the input terminal Pi(−) is at a low-voltage side.

The AC power supply apparatus 1 includes switching elements Q1 and Q2 at its primary side. The switching element (first switching circuit) Q1 is an n-metal oxide semiconductor field effect transistor (MOS-FET) (first switch element) including a body diode (first rectification element) D1. The switching element (second switching circuit) Q2 is a p-MOS-FET (second switch element) including a body diode (second rectification element) D2. The gates of the switching elements Q1 and Q2 are connected to a control circuit 20. The control circuit 20 applies pulse-shaped drive voltage to the switching elements Q1 and Q2 to control the switching with the switching elements Q1 and Q2. In addition, the control circuit 20 feeds back output voltage at a secondary side, that is, the value of AC voltage output from the AC power supply apparatus 1 to control the switching with the switching elements Q1 and Q2 in accordance with the cycle or the frequency of the output AC voltage to be generated.

The drain of the switching element Q1 is connected to the drain of the switching element Q2, and the source of the switching element Q1 is connected to the input terminal Pi(−). The source of the switching element Q2 is connected to the input terminal Pi(+).

The primary winding np of the transformer T, an inductor Lr, and a capacitor Cr are connected in series to each other. One end of the series circuit is connected to the input terminal Pi(+) (or the input terminal Pi(−)) and the other end of the series circuit is connected to the node between the drain of the switching element Q1 and the drain of the switching element Q2. The primary winding np, the inductor Lr, and the capacitor Cr compose an LC series circuit, which equivalently includes a capacitive load (capacitor) Co. The capacitive load (capacitor) Co is connected in parallel to the secondary winding ns of the transformer T.

An exemplary operation of the AC power supply apparatus 1 having the above circuit configuration will now be described. In the following description, the current flowing from the drain to the source in the switching element Q1 is denoted by id1, the voltage between the gate and the source of the switching element Q1 is denoted by Vgs1, and the voltage between the drain and the source of the switching element Q1 is denoted by Vds1. The current flowing from the source to the drain in the switching element Q2 is denoted by id2, the voltage between the gate and the source of the switching element Q2 is denoted by Vgs2, and the voltage between the drain and the source of the switching element Q2 is denoted by Vds2. The voltage of the capacitive load (capacitor) Co, that is, the AC voltage output from the AC power supply apparatus 1 is denoted by Vo. The control circuit 20 feeds back the output AC voltage Vo to alternately turn on and off the switching elements Q1 and Q2 with a short dead time sandwiched between the turning on and off of the switching element Q1 and the turning on and off of the switching element Q2. The AC power supply apparatus 1 holds the output voltage as positive voltage or negative voltage during the dead time period to generate square wave AC voltage.

Figure 2:
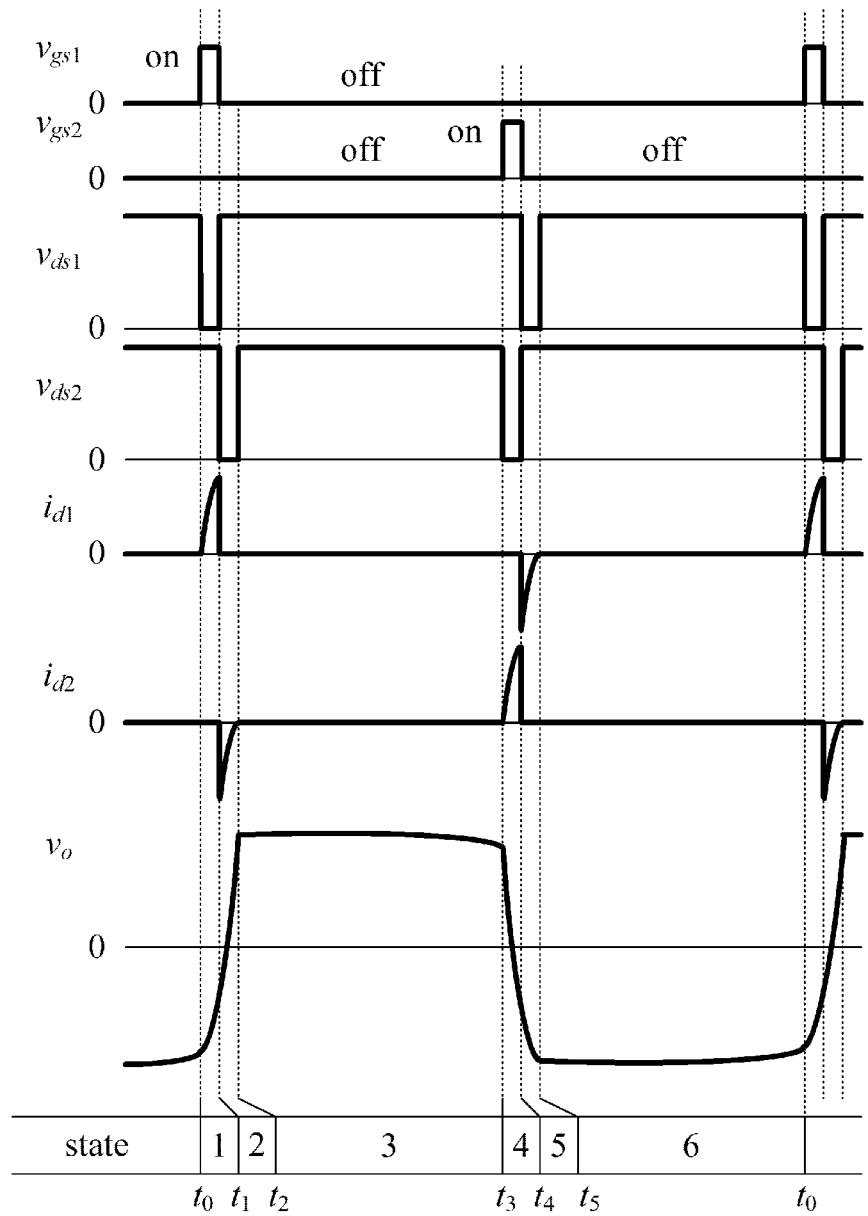
FIG. 2 shows an example of the relationship between the timings when switching elements are turned on and off and output AC voltage.

FIG. 2 shows an example of the relationship between the timings when the switching elements Q1 and Q2 are turned on and off and the output AC voltage Vo. States 1 to 6 shown in FIG. 2 will now be described. First control is performed in the States 1 to 3. The State 1 corresponds to a first period and the States 2 and 3 correspond to a second period. Second control is performed in the States 4 to 6. The State 4 corresponds to a third period and the States 5 and 6 correspond to a fourth period. The switching between the switching elements Q1 and Q2 is controlled by the control circuit 20.

(State 1: time t0 to t1)

Upon application of the voltage Vgs1 to turn on the switching element Q1, the switching element Q1 conducts, the voltage Vds1 is made "0", and the current id1 flows. At this time, the inductor Lr, the capacitor Cr, the transformer T, and the capacitive load (capacitor) Co form a resonant circuit. This resonant circuit has inductive impedance in which the current is varied behind a variation in the voltage. The current id1 is accumulated in the inductor Lr and flows through the primary winding np of the transformer T. Induced current flows through the secondary winding ns, current flows through the capacitive load (capacitor) Co, and the AC voltage Vo is output. Upon turning off of the switching element Q1, the current id1 is made "0."

(State 2: time t1 to t2)

Immediately after the switching element Q1 is turned off, current flows through the body diode D2 of the switching element Q2 with the energy accumulated in the inductor Lr. The current flowing at this time is the current id1, as in the State 1, and the current id1 flows through the primary winding np of the transformer T. Induced current flows through the secondary winding ns, current flows through the capacitive load (capacitor) Co, and the AC voltage Vo is output. The current id2 has a waveform having a reverse polarity with respect to that of the current id1. At this time, the capacitor Cr is charged. When the body diode D2 has no current flowing therethrough, the body diode D2 is made non-conductive and the charge into the capacitor Cr is finished. The supply of the current to the capacitive load (capacitor) Co at the secondary side is also finished.

(State 3: time t2 to t3)

While the switching elements Q1 and Q2 are turned off, no current flows at the primary side. At the secondary side, the capacitive load (capacitor) Co and the secondary winding ns form a secondary-side resonant circuit. Since the inductance of the secondary winding ns is sufficiently high and the resonant frequency of the secondary-side resonant circuit is sufficiently low, the variation in the output voltage is small and the output AC voltage Vo is kept substantially constant.

(State 4: time t3 to t4)

Upon application of the voltage Vgs2 to turn on the switching element Q2, the switching element Q2 conducts and the voltage Vds2 is made "0". At this time, the inductor Lr, the capacitor Cr, the transformer T, and the capacitive load (capacitor) Co form a resonant circuit. The voltage charged in the capacitor Cr in the State 2 is discharged and the current id2 flows through the resonant circuit that is formed. The current id2 is accumulated in the inductor Lr and flows through the primary winding np of the transformer T. Induced current flows through the secondary winding ns, current flows through the capacitive load (capacitor) Co, and the AC voltage Vo is output. The output AC voltage Vo at this time has the reverse polarity with respect to that in the State 1. Upon turning off of the switching element Q2, the current id2 is made "0."

(Time 5: time t4 to time t5)

Immediately after the switching element Q2 is turned off, the body diode D1 of the switching element Q1 conducts with the energy accumulated in the inductor Lr and the capacitor Cr is caused to discharge. The current id1 flows into the DC input power supply Vin to be regenerated. The current id1 flows through the primary winding np of the transformer T at this time. Induced current flows through the secondary winding ns, current flows through the capacitive load (capacitor) Co, and the AC voltage Vo is output. The current id1 has a waveform having a reverse polarity with respect to that of the current id2. When the body diode D1 has no current flowing therethrough, the body diode D1 is made non-conductive and the discharge from the capacitor Cr is finished. The supply of the current to the capacitive load (capacitor) Co at the secondary side is also finished.

(State 6: time t5 to time t0)

While the switching elements Q1 and Q2 are turned off, no current flows at the primary side. At the secondary side, the capacitive load (capacitor) Co and the secondary winding ns form a secondary-side resonant circuit. Since the inductance of the secondary winding ns is sufficiently high and the resonant frequency of the secondary-side resonant circuit is sufficiently low, the variation in the output voltage is small and the output AC voltage Vo is kept substantially constant.

The periods of the States 1 to 6 may be appropriately varied. For example, in order to control the absolute value of the output AC voltage Vo, the control circuit 20 adjusts the on periods of the switching elements Q1 and Q2, that is, the periods of the States 1 and 4. In order to control the frequency of the output AC voltage Vo, the control circuit 20 adjusts the dead time between the switching elements Q1 and Q2, that is, the periods of the States 3 and 6.

As described above, since the AC voltage Vo can be output from one DC input power supply Vin in the AC power supply apparatus 1 according to the first preferred embodiment, it is not necessary to provide power supplies that generate the positive voltage and the negative voltage. In addition, since the AC power supply apparatus 1 according to the first preferred embodiment is configured such that the switching elements Q1 and Q2 are used in a saturation region in the output of the AC voltage, it is possible to reduce the power loss in the switching elements Q1 and Q2, compared with a configuration in which the switching is performed in an active region to use the switching elements Q1 and Q2.

Furthermore, since the frequency component of the current flowing through the transformer T is higher than the frequency of the output AC voltage Vo even when the frequency of the output AC voltage Vo is low, it is possible to prevent magnetic saturation of the transformer T. As a result, the magnetic components including the transformer T can be reduced in size, thereby realizing the reduction in size of the AC power supply apparatus 1.

In the AC power supply apparatus 1 according to the first preferred embodiment, the inductor Lr, the switching element Q1, the body diode D2, and the capacitor Cr compose a step-down converter that receives the voltage of the DC input power supply Vin and outputs the voltage of the capacitor Cr. The switching element Q1 is turned on and off to charge the capacitor Cr. The inductor Lr, the switching element Q2, the body diode D1, and the capacitor Cr compose a step-up converter that receives the voltage of the capacitor Cr and outputs the voltage of the DC input power supply Vin. The switching element Q2 is turned on and off to cause the capacitor Cr to discharge.

Second Preferred Embodiment

Figure 3:
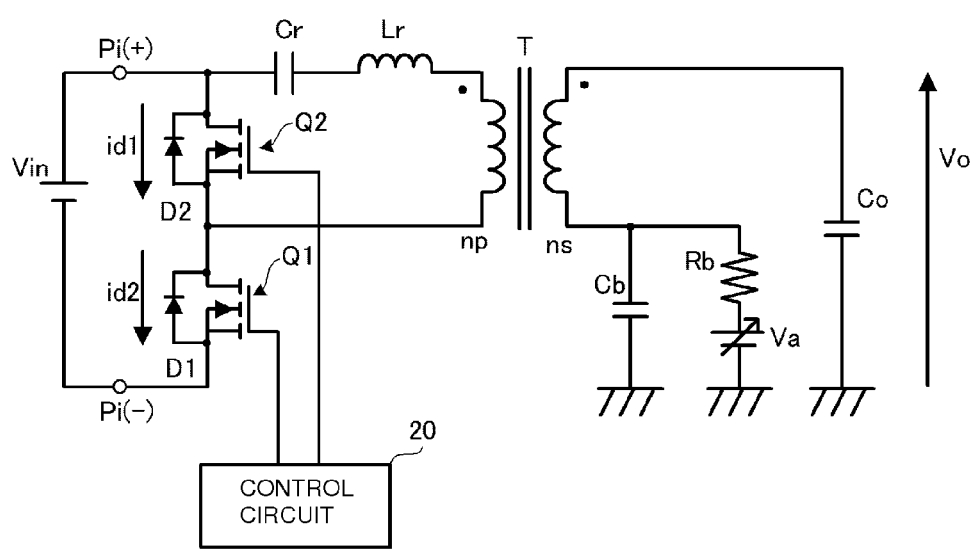
FIG. 3 is an exemplary circuit diagram of an AC power supply apparatus according to a second preferred embodiment.

An AC power supply apparatus according to a second preferred embodiment of the present invention will now be described with a focus on the difference from the first preferred embodiment. FIG. 3 is an exemplary circuit diagram of the AC power supply apparatus according to the second preferred embodiment.

In an AC power supply apparatus 2 of the second preferred embodiment, the switching element Q2 is an n-MOS-FET. The drain of the switching element Q2 is connected to the input terminal Pi(+) and the source thereof is connected to the drain of the switching element Q1. The capacitor Cr is connected between the inductor Lr and the input terminal Pi(+). The current flowing from the drain to the source in the switching element Q2 is denoted by id2. The remaining circuit configuration at the primary side of the transformer T in the AC power supply apparatus 2 is the same as that in the first preferred embodiment.

The use of the switching element Q2, which is the n-MOS-FET, allows an on resistance between the drain and the source in the switching element Q2 to be decreased to improve the efficiency. In addition, the provision of the capacitor Cr at a position different from that in the first preferred embodiment varies the variation in voltage of the capacitor Cr and the transformer T with respect to the ground to improve electromagnetic interference (EMI).

The AC power supply apparatus 2 includes a capacitor Cb, a resistor Rb, and a DC voltage source Va. The capacitive load (capacitor) Co is connected to one end of the secondary winding ns of the transformer T and is grounded. The capacitor Cb is connected to the other end of the secondary winding ns of the transformer T and is grounded. The resistor Rb is connected in series to the DC voltage source Va and the series circuit is connected to the other end of the secondary winding ns of the transformer T and is grounded. The DC voltage source Va at the secondary side applies bias voltage to reference voltage of the output AC voltage Vo.

Figure 4:
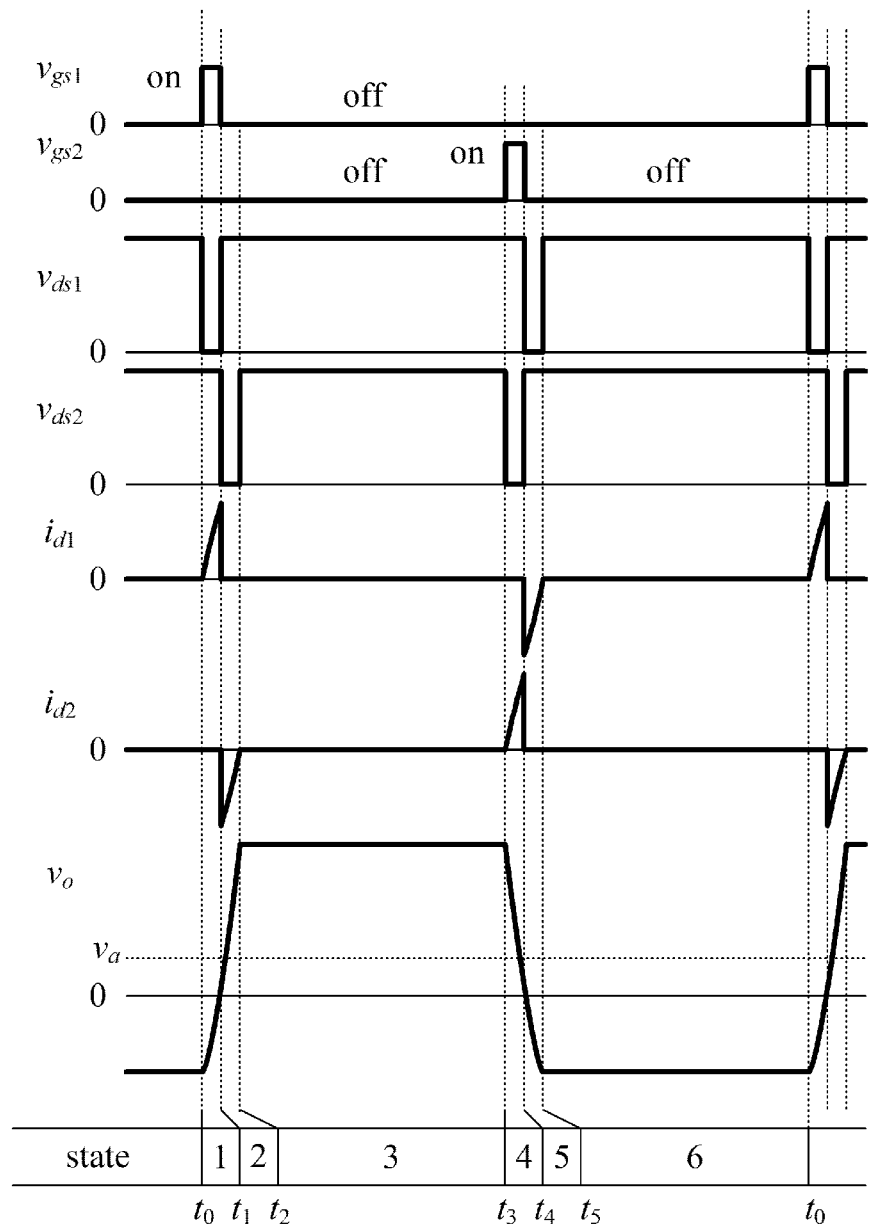
FIG. 4 shows an example of the relationship between the timings when the switching elements are turned on and off and the output AC voltage.

FIG. 4 shows an example of the relationship between the timings when the switching elements Q1 and Q2 are turned on and off and the output AC voltage Vo. Since the operation of the AC power supply apparatus 2 according to the second preferred embodiment is similar to that in the first preferred embodiment, a description of the operation of the AC power supply apparatus 2 is omitted herein. As shown in FIG. 4, since the bias voltage is applied to the reference voltage of the output AC voltage Vo with the DC voltage source Va in the second preferred embodiment, a waveform in FIG. 4 results from addition of the waveform corresponding to the voltage from the DC voltage source Va to the waveform of the output AC voltage Vo in the first preferred embodiment shown in FIG. 2.

As described above, since the AC voltage Vo can be output from one DC input power supply Vin in the AC power supply apparatus 2 according to the second preferred embodiment, it is not necessary to provide the power supplies that generate the positive voltage and the negative voltage. In addition, since the AC power supply apparatus 2 according to the second preferred embodiment is configured such that the switching elements Q1 and Q2 are used in the saturation region in the output of the AC voltage, it is possible to reduce the power loss in the switching elements Q1 and Q2, compared with the configuration in which the switching is performed in the active region to use the switching elements Q1 and Q2.

Furthermore, since the frequency component of the current flowing through the transformer T is higher than the frequency of the output AC voltage Vo even when the frequency of the output AC voltage Vo is low, it is possible to prevent the magnetic saturation of the transformer T. As a result, the magnetic components including the transformer T can be reduced in size, thereby realizing the reduction in size of the AC power supply apparatus 2.

Furthermore, in the second preferred embodiment, the use of the switching elements Q1 and Q2, which are the n-MOS-FET, allows the values of the on resistances between the drains and the sources in the switching elements Q1 and Q2 to be decreased to efficiently output the AC voltage Vo. Since the bias voltage is applied to the reference voltage of the output AC voltage Vo with the DC voltage source Va in the second preferred embodiment, it is possible to use the AC power supply apparatus 2 for a device that is required to be biased.

Third Preferred Embodiment

Figure 5:
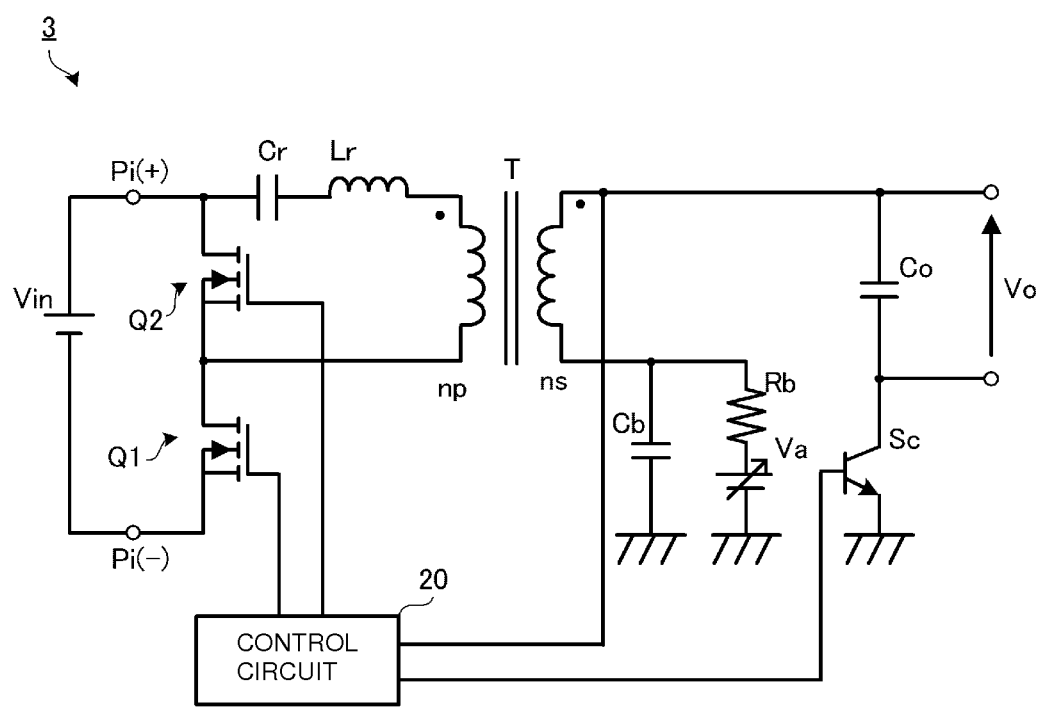
FIG. 5 is an exemplary circuit diagram of an AC power supply apparatus according to a third preferred embodiment.

An AC power supply apparatus according to a third preferred embodiment of the present invention will now be described with a focus on the difference from the first and second preferred embodiments. FIG. 5 is an exemplary circuit diagram of the AC power supply apparatus according to the third preferred embodiment. The diodes of the switching elements Q1 and Q2 are omitted in the subsequent drawings.

In an AC power supply apparatus 3 according to the third preferred embodiment, the circuit configuration at the primary side of the transformer T is the same as that in the second preferred embodiment. The AC power supply apparatus 3 includes a switching element (secondary-side switch) Sc connected between the capacitive load (capacitor) Co and the ground at the secondary side of the transformer T. The switching element Sc is connected in series to the capacitive load (capacitor) Co. The tuning on and off of the switching element Sc is controlled by the control circuit 20. The switching element Sc is turned off when the on and off of the switching elements Q1 and Q2 is switched (in the States 3 and 6 in FIG. 2). Accordingly, it is possible to prevent the electric charge accumulated in the capacitive load (capacitor) Co from being discharged from the secondary winding ns of the transformer T during the dead time period, thereby efficiently generating the output AC voltage Vo.

Fourth Preferred Embodiment

Figure 6:
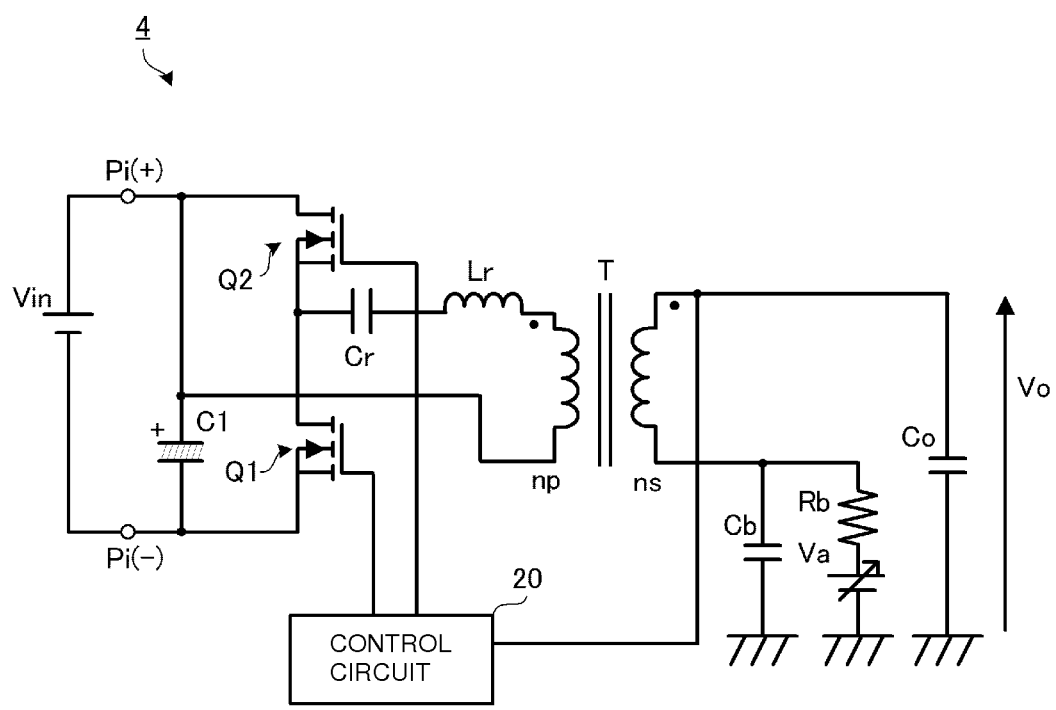
FIG. 6 is an exemplary circuit diagram of an AC power supply apparatus according to a fourth preferred embodiment.

An AC power supply apparatus according to a fourth preferred embodiment of the present invention will now be described with a focus on the difference from the first and second preferred embodiments. FIG. 6 is an exemplary circuit diagram of the AC power supply apparatus according to the fourth preferred embodiment. In an AC power supply apparatus 4 according to the fourth preferred embodiment, the circuit configuration at the secondary side of the transformer T is the same as in the second preferred embodiment.

At the primary side of the AC power supply apparatus 4, the drain of the switching element Q2 is connected to the input terminal Pi(+) and the source thereof is connected to the drain of the switching element Q1. The source of the switching element Q1 is connected to the input terminal Pi(−). The AC power supply apparatus 4 includes an electrolytic capacitor (power supply capacitor) C1 at the primary side of the transformer T. The electrolytic capacitor C1 is connected to the input terminal Pi(+) and the input terminal Pi(−) and is connected in parallel to the switching elements Q1 and Q2.

The capacitor Cr and the inductor Lr that are connected in series to each other are connected to the source of the switching element Q2 and one end of the primary winding np of the transformer T. The other end of the primary winding np is connected to one end of the electrolytic capacitor C1 at the input terminal Pi(+) side. In other words, the other end of the primary winding np is connected to the drain of the switching element Q2.

The operation in the above circuit configuration is similar to that in the first and second preferred embodiments. Although the current is difficult to flow into the DC input power supply Vin (the current is difficult to be regenerated), for example, in the State 5 in FIG. 2 when the output impedance of the DC input power supply Vin is high, it is possible to prevent the regeneration of the current from being blocked owing to the electrolytic capacitor C1 connected in parallel to the DC input power supply Vin. As a result, it is possible to efficiently output the AC voltage Vo.

Fifth Preferred Embodiment

Figure 7:
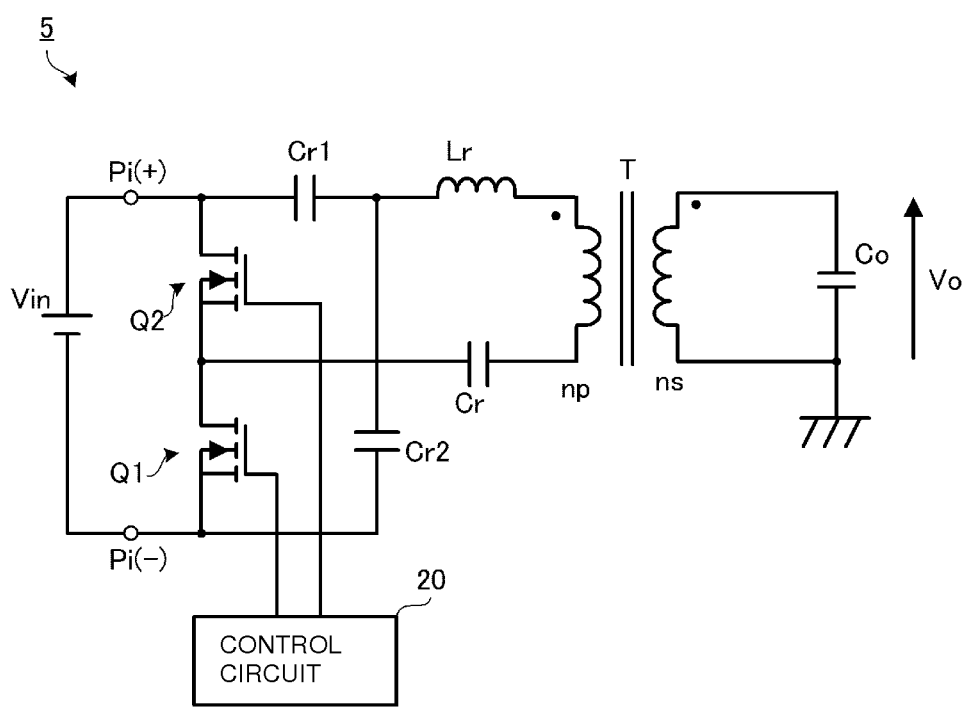
FIG. 7 is an exemplary circuit diagram of an AC power supply apparatus according to a fifth preferred embodiment.

An AC power supply apparatus according to a fifth preferred embodiment of the present invention will now be described with a focus on the difference from the above preferred embodiments. FIG. 7 is an exemplary circuit diagram of the AC power supply apparatus according to the fifth preferred embodiment. In an AC power supply apparatus 5 according to the fifth preferred embodiment, the circuit configuration at the secondary side of the transformer T is the same as in the first preferred embodiment.

The AC power supply apparatus 5 according to the fifth preferred embodiment includes capacitors Cr1 and Cr2, in addition to the configuration of the AC power supply apparatus 3 according to the third preferred embodiment. The capacitor (first shunt capacitor) Cr1 is connected in series to the inductor Lr, the primary winding np of the transformer T, and the capacitor Cr and is connected to the drain of the switching element Q2. One end of the capacitor (second shunt capacitor) Cr2 is connected to the drain of the switching element Q2 via the capacitor Cr1 and the other end the capacitor (second shunt capacitor) Cr2 is connected to the source of the switching element Q1.

In the above circuit configuration, when the switching element Q2 is turned on, the capacitor Cr1, the inductor Lr, the capacitor Cr, the transformer T, and the capacitive load (capacitor) Co form a resonant circuit. The current flowing through the resonant circuit is shunted with the capacitors Cr1 and Cr2. As the result of the shunt, the loss caused by the currents flowing through the capacitors Cr1 and Cr2 is dispersed to decrease the capacitance.

Sixth Preferred Embodiment

Figure 8:
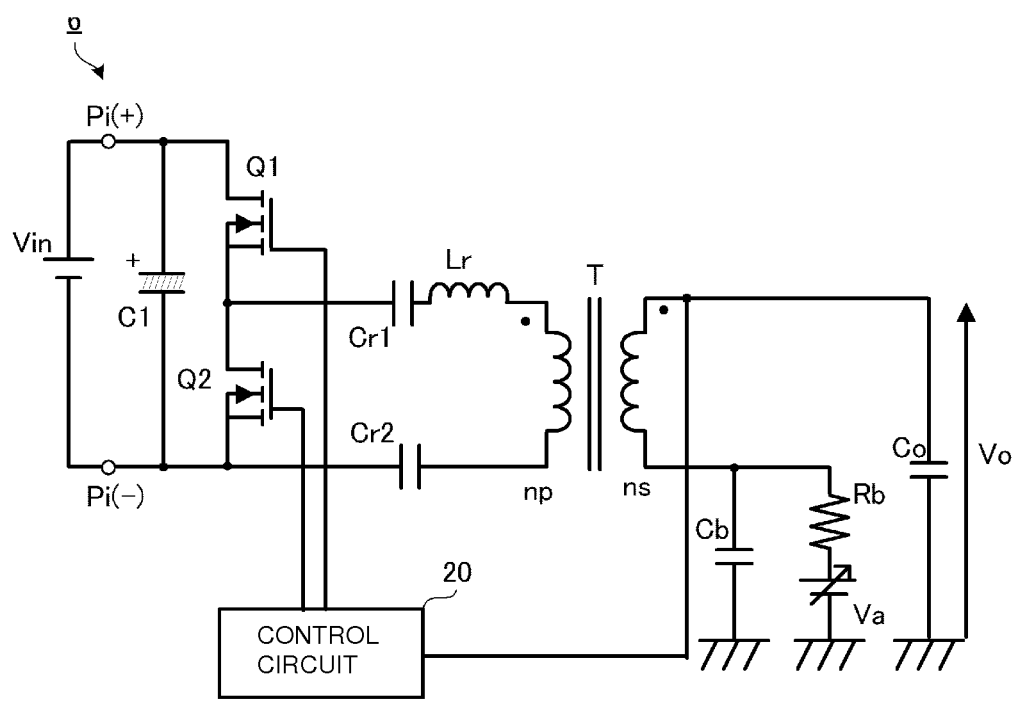
FIG. 8 is an exemplary circuit diagram of an AC power supply apparatus according to a sixth preferred embodiment.

An AC power supply apparatus according to a sixth preferred embodiment of the present invention will now be described with a focus on the difference from the above preferred embodiments. FIG. 8 is an exemplary circuit diagram of the AC power supply apparatus according to the sixth preferred embodiment. In an AC power supply apparatus 6 according to the sixth preferred embodiment, the circuit configuration at the secondary side of the transformer T is the same as in the fourth preferred embodiment. The order of the connection of the switching elements Q1 and Q2 from the input terminal Pi(+) in the AC power supply apparatus 6 is reversed, with respect to that in the above preferred embodiments.

The AC power supply apparatus 6 includes the electrolytic capacitor C1 connected in parallel to the switching elements Q1 and Q2 at the primary side, as in the fourth preferred embodiment. The AC power supply apparatus 6 includes two capacitors Cr1 and Cr2, instead of the capacitor Cr provided in, for example, the AC power supply apparatus in the first preferred embodiment. The two capacitors (connection capacitors) Cr1 and Cr2 are connected in series to the inductor Lr and the primary winding np of the transformer T. The capacitor Cr1 is connected to the source of the switching element Q1 and the capacitor Cr2 is connected to the source of the switching element Q2.

In the above circuit configuration, the provision of the two capacitors Cr1 and Cr2 and the connection of the inductor Lr and the primary winding np of the transformer T to the switching element Q1 and so on via the capacitors Cr1 and Cr2 cause the transformer T and the inductor Lr to be electrically insulated from the DC input power supply Vin side. Accordingly, it is possible to simplify the insulation structure of the transformer T.

Seventh Preferred Embodiment

Figure 9:
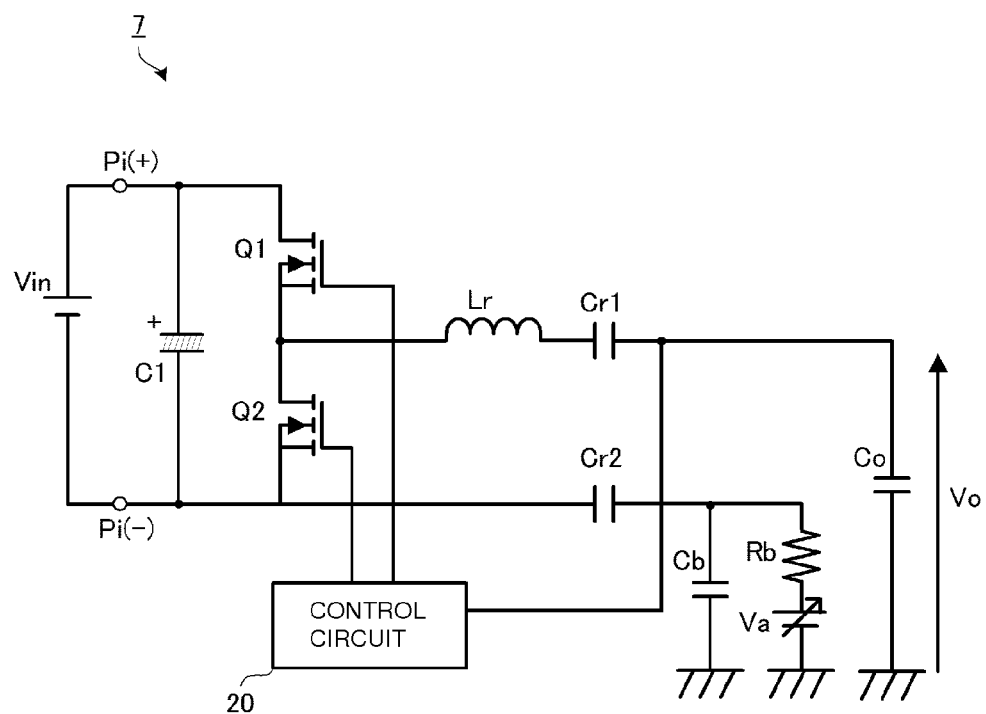
FIG. 9 is an exemplary circuit diagram of an AC power supply apparatus according to a seventh preferred embodiment.

An AC power supply apparatus according to a seventh preferred embodiment of the present invention will now be described with a focus on the difference from the above preferred embodiments. FIG. 9 is an exemplary circuit diagram of the AC power supply apparatus according to the seventh preferred embodiment.

An AC power supply apparatus 7 according to the seventh preferred embodiment does not include the transformer T. In the AC power supply apparatus 7, the primary side circuit and the secondary side circuit of the transformer T described in the sixth preferred embodiment are connected to each other with the capacitors Cr1 and Cr2. This configuration eliminates the need for the transformer T to realize the reduction in size of the AC power supply apparatus 7.

Eighth Preferred Embodiment

Figure 10:
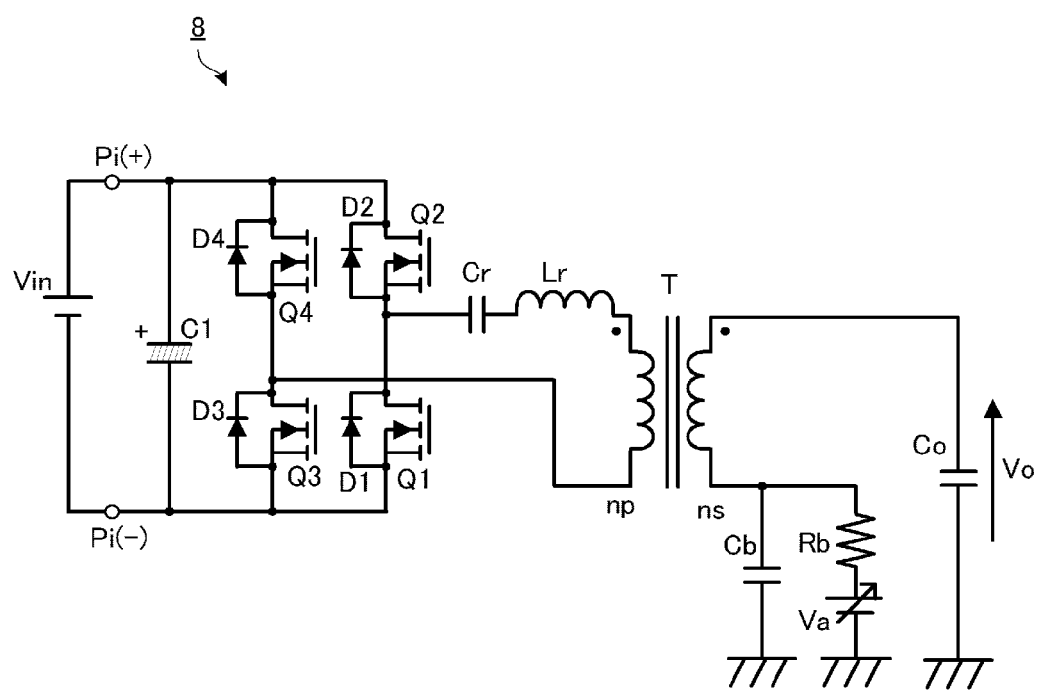
FIG. 10 is an exemplary circuit diagram of an AC power supply apparatus according to an eighth preferred embodiment.

An AC power supply apparatus according to an eighth preferred embodiment of the present invention will now be described with a focus on the difference from the above preferred embodiments. FIG. 10 is an exemplary circuit diagram of the AC power supply apparatus according to the eighth preferred embodiment. The circuit configuration at the secondary side of the transformer T in an AC power supply apparatus 8 according to the eighth preferred embodiment is the same as in the fourth and sixth preferred embodiments and so on.

The AC power supply apparatus 8 according to the eighth preferred embodiment includes four switching elements Q1, Q2, Q3, and Q4. The switching element (third switching circuit) Q3 includes an n-FET (third switch element) and a diode (third rectification element) D3. The switching element (fourth switching circuit) Q4 includes an n-FET (fourth switch element) and a diode (fourth rectification element) D4. In the switching elements Q3 and Q4, the forward direction of the diode D3 coincides with that of the diode D4, as in the switching elements Q1 and Q2. The switching elements Q3 and Q4 are connected in series to the input terminal Pi(+). The switching elements Q3 and Q4 are connected in parallel to the switching elements Q1 and Q2. The switching of the switching elements Q3 and Q4 is controlled by the control circuit 20 (not shown in FIG. 10) which controls the switching of the switching elements Q1 and Q2. The circuit at the primary side composes a so-called full bridge circuit.

The capacitor Cr, the inductor Lr, and the primary winding np of the transformer T are connected in series to each other. One end of the series circuit is connected to the source of the switching element Q2 and the other end of the series circuit is connected to the source of the switching element Q4. In this circuit configuration, the control circuit 20 turns on and off the switching element Q4 in synchronization with the turning on and off of the switching element Q1 and turns on and off the switching element Q3 in synchronization with the turning on and off of the switching element Q2 to output the AC voltage Vo. The use of the four switching elements in the above manner allows the breakdown voltage necessary for each switching element to be decreased, and the use of the elements having a low on resistance allows the efficient supply of the AC voltage to be realized.

Ninth Preferred Embodiment

Figure 11:
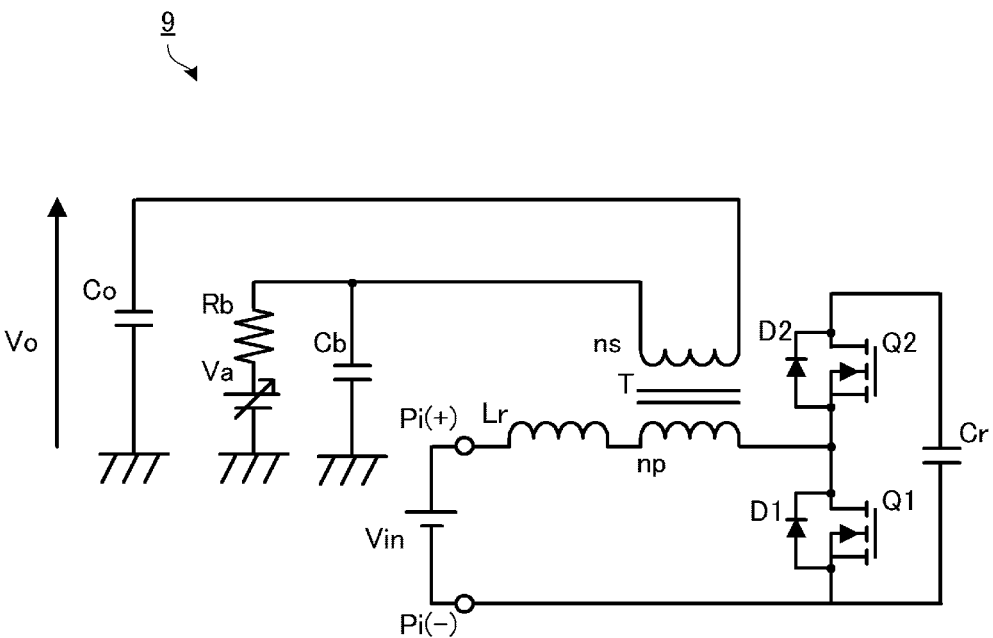
FIG. 11 is an exemplary circuit diagram of an AC power supply apparatus according to a ninth preferred embodiment.

An AC power supply apparatus according to a ninth preferred embodiment of the present invention will now be described with a focus on the difference from the above preferred embodiments. FIG. 11 is an exemplary circuit diagram of the AC power supply apparatus according to the ninth preferred embodiment. The circuit configuration at the secondary side of the transformer T in an AC power supply apparatus 9 according to the ninth preferred embodiment is the same as in the fourth and sixth preferred embodiments and so on.

At the primary side of the transformer T in the AC power supply apparatus 9, the inductor Lr is connected in series to the primary winding np of the transformer T. One end of the series circuit is connected to the input terminal Pi(+) and the other end of the series circuit is connected to the drain of the switching element Q1. The drain of the switching element Q1 is also connected to the source of the switching element Q2 and the source of the switching element Q1 is connected to the input terminal Pi(−). The drain of the switching element Q2 is connected to the input terminal Pi(−) via the capacitor Cr.

The above circuit receives the voltage of the DC input power supply Vin and turns on the switching element Q1 to accumulate the energy in the inductor Lr, as in the above preferred embodiments. Immediately after the switching element Q1 is turned off, the body diode D2 of the switching element Q2 conducts and the capacitor Cr is charged. Since the voltage of the DC input power supply Vin and the inductor Lr in which the energy is accumulated are used as the input to charge the capacitor Cr at this time, the voltage of the capacitor Cr is higher than the voltage of the DC input power supply Vin. Upon turning on of the switching element Q2, the capacitor Cr discharges.

Since the voltage of the capacitor Cr is made higher than the voltage of the DC input power supply Vin in the above manner, it is possible to make the capacitance value of the capacitor Cr low.

In the AC power supply apparatus 9 according to the ninth preferred embodiment, the inductor Lr, the switching element Q1, the body diode D2, and the capacitor Cr compose a step-up converter that receives the voltage of the DC input power supply Vin and outputs the voltage of the capacitor Cr. The switching element Q1 is turned on and off to charge the capacitor Cr. The inductor Lr, the switching element Q2, the body diode D1, and the capacitor Cr compose a step-down converter that receives the voltage of the capacitor Cr and outputs the voltage of the DC input power supply Vin. The switching element Q2 is turned on and off to cause the capacitor Cr to discharge.

Tenth Preferred Embodiment

Figure 12:
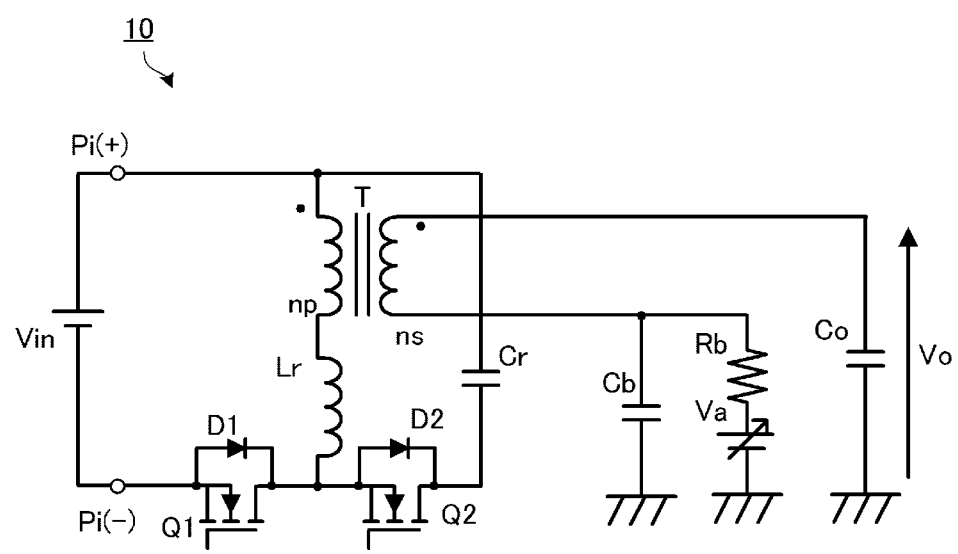
FIG. 12 is an exemplary circuit diagram of an AC power supply apparatus according to a tenth preferred embodiment.

An AC power supply apparatus according to a tenth preferred embodiment of the present invention will now be described with a focus on the difference from the above preferred embodiments. FIG. 12 is an exemplary circuit diagram of the AC power supply apparatus according to the tenth preferred embodiment. The circuit configuration at the secondary side of the transformer T in an AC power supply apparatus 10 according to the tenth preferred embodiment is the same as in the fourth and sixth preferred embodiments and so on.

At the primary side of the transformer T in the AC power supply apparatus 10, the drain of the switching element Q1 is connected to the source of the switching element Q2. The source of the switching element Q1 is connected to the input terminal Pi(−). The drain of the switching element Q2 is connected to the input terminal Pi(+) via the capacitor Cr. The inductor Lr and the primary winding np of the transformer T are connected in series to each other, and the series circuit is connected to the drain of the switching element Q1 (the source of the switching element Q2) and the input terminal Pi(+).

The above circuit receives the voltage of the DC input power supply Vin and turns on the switching element Q1 to accumulate the energy in the inductor Lr, as in the above preferred embodiments. Immediately after the switching element Q1 is turned off, the body diode D2 of the switching element Q2 conducts and the capacitor Cr is charged. Upon turning on and off of the switching element Q2, the capacitor Cr discharges. The charge capacitance of the capacitor Cr can be adjusted on the basis of the on and off times of the switching element Q1 in the above circuit. In other words, the voltage of the DC input power supply Vin can be stepped up or down to charge the capacitor Cr.

In the AC power supply apparatus 10 according to the tenth preferred embodiment, the inductor Lr, the switching element Q1, the body diode D2, and the capacitor Cr compose a step-up and step-down converter that receives the voltage of the DC input power supply Vin and outputs the voltage of the capacitor Cr. The switching element Q1 is turned on and off to charge the capacitor Cr. The inductor Lr, the switching element Q2, the body diode D1, and the capacitor Cr compose a step-up and step-down converter that receives the voltage of the capacitor Cr and outputs the voltage of the DC input power supply Vin. The switching element Q2 is turned on and off to cause the capacitor Cr to discharge.

While the AC power supply apparatuses according to the multiple preferred embodiments are described above, the specific configurations, etc. of the AC power supply apparatuses may be appropriately varied. The effects and advantages described in the above preferred embodiments are only exemplary preferred effects and advantages of the present invention and the effects and advantages of the present invention are not limited to the ones described in the above preferred embodiments.

For example, the inductor Lr described in the above preferred embodiments may not be physically provided and the leakage inductance of the transformer T may be used as the inductor Lr. Each switching element may be the n-MOS-FET or the p-MOS-FET. Instead of the body diode, a separate diode may be connected to each switching element.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An AC power supply apparatus that supplies AC voltage to a capacitive load, the AC power supply apparatus comprising:
- an input terminal to which a DC power supply is connected;
- a first switching circuit in which a first switch element is connected in parallel to a first rectification element;
- a second switching circuit which is connected in series to the first switching circuit and in which a second switch element is connected in parallel to the a second rectification element;
- a transformer configured to include a primary winding and a secondary winding;
- a resonant inductor and a resonant capacitor configured to be connected in series to the primary winding; and
- a control unit configured to repeat first control in which, after the first switch element is turned on during a first period, the first switch element is turned off during a second period and second control in which, after the second switch element is turned on during a third period, the second switch element is turned off during a fourth period,
- wherein the resonant inductor, the resonant capacitor, and the capacitive load compose a resonant circuit that has inductive impedance in which current is varied behind a variation in voltage,
- wherein the control unit turns on the first switch element during the first period and applies current to the first switch element to charge the resonant capacitor; the control unit turns off the first switch element during the second period and applies current to the first rectification element to charge the resonant capacitor; the charge period is finished when no current flows; and the current during the charge period flows through the primary winding, induced current flows through the secondary winding, and current flows through the capacitive load to apply voltage,
- wherein the control unit turns on the second switch element during the third period and applies current to the second switch element to cause the resonant capacitor to discharge; the control unit turns off the second switch element during the fourth period and applies current to the second rectification element to cause the resonant capacitor to discharge; the discharge period is finished when no current flows; and the current during the discharge period flows through the primary winding, induced current flows through the secondary winding, and reverse current with respect to that during the charge period flows through the capacitive load to apply reverse voltage, and
- wherein the control unit controls the first period and the third period to control an absolute value of the AC voltage and controls the second period and the fourth period to control a frequency of the AC voltage.

2. The AC power supply apparatus according to claim 1, further comprising:
- a DC voltage source configured to apply bias voltage to the capacitive load.

3. The AC power supply apparatus according to claim 1, further comprising:
- a secondary-side switch configured to connect or block a path between the capacitive load and ground.

4. The AC power supply apparatus according to claim 1, further comprising:
- a power supply capacitor configured to be connected to both ends of the input terminal.

5. The AC power supply apparatus according to claim 1, wherein an LC series circuit composed of the primary winding, the resonant inductor, and the resonant capacitor is connected to both ends of the first switching circuit or the second switching circuit.

6. The AC power supply apparatus according to claim 1, further comprising:
- a series circuit composed of two shunt resonant capacitors, which is connected in parallel to a series circuit composed of the first switching circuit and the second switching circuit,
- wherein an LC series circuit composed of the primary winding, the resonant inductor, and the resonant capacitor is connected to a node between the first switching circuit and the second switching circuit and a node between the two shunt resonant capacitors.

7. The AC power supply apparatus according to claim 1, further comprising:
- a third switching circuit in which a third switch element is connected in parallel to a third rectification element; and
- a fourth switching circuit in which a fourth switch element is connected in parallel to a fourth rectification element,
- wherein a series circuit composed of the third switching circuit and the fourth switching circuit is connected in parallel to a series circuit composed of the first switching circuit and the second switching circuit, and
- wherein an LC series circuit composed of the primary winding, the resonant inductor, and the resonant capacitor is connected to a node between the first switching circuit and the second switching circuit and a node between the third switching circuit and the fourth switching circuit.

8. The AC power supply apparatus according to claim 5, wherein the resonant capacitor includes two resonant capacitors, and
wherein the resonant capacitors are provided at one end and the other end of the LC series circuit.

9. The AC power supply apparatus according to claim 1, wherein the resonant capacitor includes two resonant capacitors, and
wherein, instead of the transformer, the two resonant capacitors are connected in series to the capacitive load to provide electrical insulation with the resonant capacitors and current is applied to the capacitive load to apply voltage.

10. The AC power supply apparatus according to claim 5, wherein the resonant inductor, the first switch element, the second rectification element, and the resonant capacitor compose a step-down converter during the first period and the second period, and
wherein the resonant inductor, the second switch element, the first rectification element, and the resonant capacitor compose a step-up converter during the third period and the fourth period.

11. The AC power supply apparatus according to claim 1, wherein one end of the first switching circuit is connected to one end of the input terminal via the primary winding and the resonant inductor,
wherein the other end of the first switching circuit is connected to the other end of the input terminal,
wherein the resonant capacitor is connected in parallel to a series circuit composed of the first switching circuit and the second switching circuit, wherein the resonant inductor, the first switch element, the second rectification element, and the resonant capacitor compose a step-up converter during the first period and the second period, and wherein the resonant inductor, the second switch element, the first rectification element, and the resonant capacitor compose a step-down converter during the third period and the fourth period.

12. The AC power supply apparatus according to claim 1, wherein one end of a series circuit composed of the first switching circuit and the second switching circuit is connected to one end of the input terminal via the resonant capacitor and the other end of the series circuit is connected to the other end of the input terminal, wherein the primary winding and the resonant inductor are connected between a node between the first switching circuit and the second switching circuit and the one end of the input terminal, wherein the resonant inductor, the first switch element, the second rectification element, and the resonant capacitor compose a step-up and step-down converter during the first period and the second period, and wherein the resonant inductor, the second switch element, the first rectification element, and the resonant capacitor compose a step-up and step-down converter during the third period and the fourth period.

* * * * *